United States Patent
Hatakeyama (10) Patent No.: US 6,718,867 B2
(45) Date of Patent: Apr. 13, 2004

(54) APPARATUS FOR PROCESSING THE INGREDIENTS OF FOODS/BEVERAGES

(75) Inventor: Kouichi Hatakeyama, Tokyo (JP)

(73) Assignees: Japan Home Supply Kabushiki Kaisha, Tokyo (JP); Nagata Seiki Kabushiki Kaisha, Tokyo (JP)

(*) Notice: Subject to any disclaimer, the term of this patent is extended or adjusted under 35 U.S.C. 154(b) by 149 days.

(21) Appl. No.: 10/142,982

(22) Filed: May 13, 2002

(65) Prior Publication Data

US 2002/0172091 A1 Nov. 21, 2002

(30) Foreign Application Priority Data

May 15, 2001 (JP) ........................................ 2001-144179

(51) Int. Cl.⁷ ................................................ A23L 1/00
(52) U.S. Cl. .............................. 99/511; 99/287; 99/513
(58) Field of Search .......................... 99/275, 279, 286, 99/287, 484–486, 489, 492, 509–513, 495; 210/386.1, 360.1; 241/188.1, 278.1, 282.1, 282.2; 366/219, 314, 234–236, 205, 206; 494/36, 53, 43, 56, 58; 426/61, 63, 49, 52, 533, 599, 523

(56) References Cited

U.S. PATENT DOCUMENTS

| | | | | |
|---|---|---|---|---|
| 2,757,696 A | * | 8/1956 | Billard | 99/511 |
| 2,844,176 A | * | 7/1958 | Barrows et al. | 241/188.1 |
| 3,407,858 A | * | 10/1968 | Smith et al. | 99/511 |
| 3,519,047 A | * | 7/1970 | Peterson et al. | 241/278.1 |
| 4,681,031 A | * | 7/1987 | Austad | 99/511 |
| 5,031,522 A | * | 7/1991 | Brixel et al. | 99/511 |
| 5,193,448 A | * | 3/1993 | Antonio | 99/512 |
| 5,445,070 A | * | 8/1995 | Rebel | 99/511 |
| 5,662,032 A | * | 9/1997 | Baratta | 99/513 |
| 5,669,289 A | * | 9/1997 | Chen | 99/511 |
| 5,771,791 A | * | 6/1998 | Ling et al. | 99/492 |
| 5,924,357 A | * | 7/1999 | Chen | 99/511 |
| 6,164,196 A | * | 12/2000 | Deschamps et al. | 99/513 |

* cited by examiner

Primary Examiner—Timothy F. Simone
(74) Attorney, Agent, or Firm—Rader, Fishman & Grauer PLLC (57) ABSTRACT

A combined centrifugal force (X+Y) is produced in a container (8) when the container on a distal end of an arm (3) circles around a main rotary shaft (2) of the arm and simultaneously rotates on its own rotary shaft (6) in harmony with the circling motion thereof. The starting ingredients for a food/beverage product are received in the container and subjected to the combined centrifugal force, so that the ingredients are processed into the food/beverage product. Various types of elements such as a sieve-like capsule member (10) detachably mounted in the container (8), a small concave-convex portion provided in an appropriate inner surface of the container (8), and/or a raised floor member (15) provided with a pair of a radial blade (12) and its corresponding radial slot (14) detachably mounted in the container are used to enhance the processing operation.

6 Claims, 11 Drawing Sheets

APPARATUS FOR PROCESSING THE INGREDIENTS OF FOODS/BEVERAGES

BACKGROUND OF THE INVENTION

1. Field of the Invention

The present invention relates to an apparatus for processing the starting ingredients for a desired food/beverage product, and more particularly to such an apparatus having a construction in which a container for receiving therein the starting ingredients is obliquely mounted on a raised oblique distal end of a rotary arm in a manner such that the container circles around a vertical main rotary shaft of the arm in a condition in which the container rotates on its own inclined rotary shaft mounted on the distal end of the rotary arm, so that the starting ingredients received in the container are subjected to a combined centrifugal force inside the container and mixed, stirred and kneaded together therein, whereby the ingredients are transformed into the desired food/beverage product.

2. Description of the Related Art

Various types of an apparatus for mixing and kneading the starting materials for a desired non-food/beverage product by using a combined centrifugal force generated inside a container of the apparatus are well known as disclosed in the prior art, for example such as Japanese Patent application Laid-Open Nos.: Sho 63-310629; and, Hei 10-43568.

Figure 1:
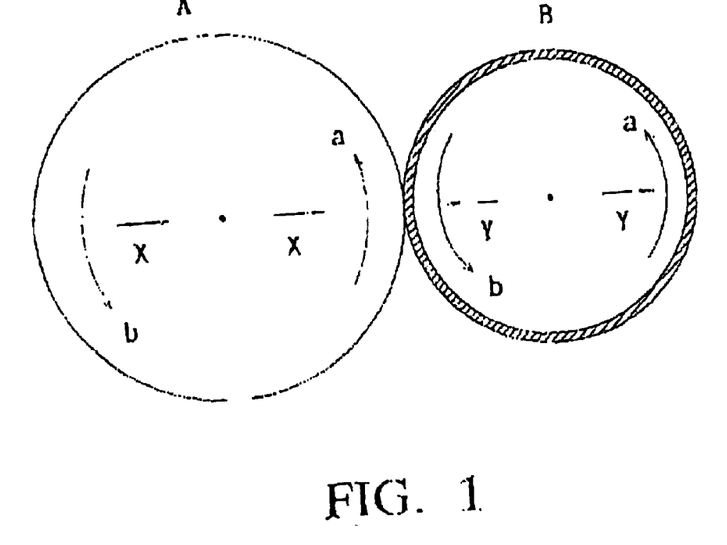
FIG. 1 is a view showing how the combined centrifugal force is produced in the container when the container circles around the main rotary shaft of the arm and simultaneously rotates on its center axis, illustrating a rotation locus circle of the end portion of the arm.
Figure 2:
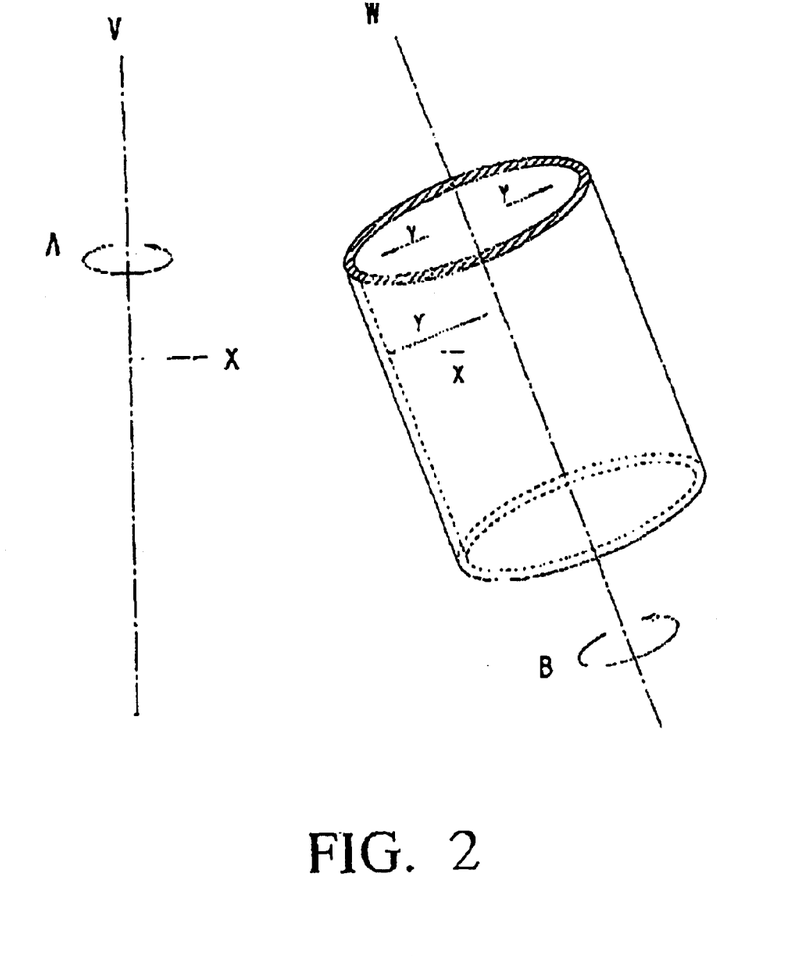
FIG. 2 is a view showing how the combined centrifugal force is produced in the container when the container circles around the main rotary shaft of the arm as the container rotates on its own center axis, wherein the arm rotates in a horizontal plane and the container is mounted on an outer oblique distal end of the arm in a condition in which the container is obliquely mounted on the distal end of the arm and therefore has its upper opening portion directed to a center axis of the main rotary shaft of the arm.
Figure 3:
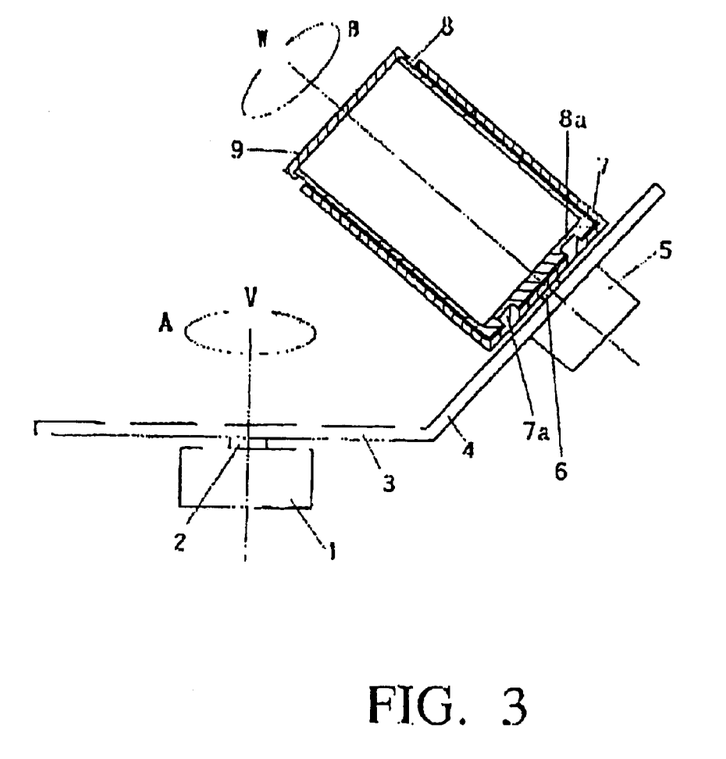
FIG. 3 is a longitudinal sectional view of the apparatus provided with the container.

In the conventional apparatus, the starting materials for the desired non-food/beverage product are received in the container of the apparatus and processed as follows: namely, As shown in FIGS. 1 to 3, the reference letter "A" denotes a rotation locus circle of a rotary arm 3 (shown in FIG. 3), and the reference letter "B" denotes a rotation locus circle of a container 8. As shown in FIG. 3, the container 8 is obliquely mounted on a raised inclined distal end 4 of the rotary arm 3 to circle around a main rotary shaft 2 of the arm 3 and simultaneously rotates on its own oblique rotary shaft 6 in harmony with the rotational motion of the arm 3. As a result, the starting materials for the desired non-food/beverage product received in the container 8 are subjected to a combined centrifugal force (X+Y) generated inside the container 8, where X and Y are: a centrifugal force X generated in the distal end 4 of the arm 3 when the arm 8 rotates on the main rotary shaft 2; and, a centrifugal force Y generated in the container 8 when the container 8 rotates on its own rotary shaft 6 in a condition in which the arm 3 stops its rotation, respectively.

As is clear from FIG. 3, when both the arm 3 and the container 8 are rotated on their rotary shafts 2 and 6, respectively, the starting materials contained in the container 8 are subjected to both the centrifugal forces X and Y. As is clear from FIGS. 1 and 3, these centrifugal forces X, Y are added to each other and therefore strengthened when the rotations of the arm 3 and the container 8 are coincident in direction (a, b) with each other. In contrast with this, when the rotations of the arm 3 and the container 8 are opposite to each other in direction (a, b), their centrifugal forces X, Y are subtracted from each other and therefore weakened. As a result, the combined centrifugal force (X+Y) generated in any fixed point of the container 8 varies substantially in a sinusoidal manner when both the arm 3 and the container 8 are rotated. Therefore, the starting materials contained in the container 8 of the apparatus are subjected to the combined centrifugal force (x+Y), and therefore effectively mixed with each other and sufficiently kneaded together inside the container 8.

As is clear from FIG. 3, the container 8 rotates on its inclined center axis W corresponding to a centerline of the rotary shaft 6. On the other hand, the arm 3 rotates on its vertical center axis V corresponding to a centerline of the main rotary shaft 2.

Since the container 8 is obliquely mounted on the distal end 4 of the rotary arm 3, the combined centrifugal force (X+Y) generated in the container 8 depends on a level or height inside the container 8. In other words, variations in strength of the combined centrifugal force (X+Y) increase as the level or height inside the container 8 decreases to strength the centrifugal force X derived from the rotation of the arm 2. As is clear from FIG. 3, since the effective radius of the rotary arm 3 increases as the level inside the container 8 decreases, the centrifugal force X derived from the rotation of the arm 2 increases as the level inside the container 8 decreases.

Further, since the container 8 is obliquely mounted on the arm 3, the centrifugal force X acts as a kind of additional gravity on an inner bottom of the container 8, which enhances the processing operation of the starting materials contained in the container 8.

It is well known in the prior art to control the combined centrifugal force (X+Y) in strength by controlling the rotational speed of each of the rotary arm 3 and the container 8.

Although various types of non-food products have been produced by using the conventional apparatus, a need exists in the art for an apparatus for processing the starting ingredients for a desired food/beverage product, in an easy manner, at low cost through the lowest possible number of process steps, wherein the desired food/beverage product is, for example, a high-quality dough which is substantially made of water and flour and adapted to be formed as Japanese noodles having a strong bite/mouth feel.

SUMMARY OF THE INVENTION

Under such circumstances, the present invention was made to meet the above need by finding out the possibility of application of the conventional apparatus to the food industry. In this connection, the inventor of the present invention has already proposed an apparatus and method for producing a high-quality dough adapted to be formed as the Japanese noodles in his Japanese Patent No. 2000-122560.

Consequently, it is an object of the present invention to provide an improved apparatus for processing the starting ingredients for a desired food/beverage product such the dough and any other food/beverage products.

In accordance with the present invention, the above object of the present invention is accomplished by providing:

In an apparatus for processing the ingredients for a food/beverage product by using a combined centrifugal force (X+Y) generated inside a container (8) which is obliquely mounted on an raised oblique distal end (4) of a rotary arm (3) rotating on a main rotary shaft (2), wherein the container (8) received therein the ingredients rotates on its own rotary shaft (2) and simultaneously circles around the main rotary shaft (2) to produce the combined centrifugal force (X+Y) inside the container (8), so that the ingredients are subjected to the combined centrifugal force (X+Y) and therefore mixed, stirred and kneaded together inside the container (8), the improvement wherein:

a sieve-like capsule member (10) for receiving the ingredients therein is detachably mounted in the container (8) and firmly fixed thereto, not to move therein when the container (8) is subjected to the combined centrifugal force (X+Y).

In the apparatus, preferably, a small concave-convex portion (20) is formed in an inner bottom surface of the container (8).

Further, preferably, in the apparatus: a raised floor member (15) is detachably mounted in the container (8) in an insertion manner and firmly fixed thereto, not to move therein when the container (8) is subjected to the combined centrifugal force (X+Y); and, the raised floor member (15) serves as a strainer and is provided with a radial blade (12).

Still further, preferably, in the apparatus: a raised floor member (18) is detachably mounted in the container (8) in an insertion manner and firmly fixed thereto, not to move therein when the container (8) is subjected to the combined centrifugal force (X+Y); and, the raised floor member (18) is provided with a small concave-convex portion (17) in its upper surface.

In the apparatus, preferably, the container (8) is provided with a small concave-convex portion in each of its inner peripheral surface and its inner bottom surface.

Further, preferably, in the apparatus: a partition capsule member (30) is detachably mounted in the container (8) in an insertion manner to define a receptacle space (31) between an inner peripheral surface of the container (8) and an outer peripheral surface of the partition capsule member (30); the partition capsule member (30) is fixedly mounted so as not to move in the container (8) and receives therein the ingredients; and, the receptacle space (31) receives therein a cooling material for cooling the ingredients or a heating material for heating the ingredients.

Consequently, it is possible for the apparatus of the present invention having the above construction to efficiently produce the food/beverage product excellent in bite/mouth feel, color, taste and flavor.

BRIEF DESCRIPTION OF THE DRAWINGS

The above and other objects, advantages and features of the present invention will be more apparent from the following description taken in conjunction with the accompanying drawings in which:

FIG. 8 is a partially broken perspective view of the container of a dryer type provided with a perforated raised floor member forming a cooking utensil such as a mortar, a grater or the like;

DETAILED DESCRIPTION OF THE PREFERRED EMBODIMENTS

The best modes for carrying out the present invention will be described in detail using embodiments of the present invention with reference to the accompanying drawings.

FIG. 3 shows essential components of an embodiment of an apparatus of the present invention for processing the starting ingredients for a desired food/beverage product.

As shown in FIG. 3, a main rotary shaft 2 is rotatably driven by a drive unit 1. Fixedly mounted on an upper end portion of the main drive shaft 2 is a rotary arm 3 which is provided with a raised oblique or inclined portion 4 in its distal end.

A rotary drive mechanism 5 for rotatably driving the rotary shaft 6 of the container 8 in harmony with the rotation of the arm 3 is fixedly mounted on a lower surface of the raised oblique portion 4 of the arm 3.

A suitable transmission (not shown) constructed of gears and/or belts and pulleys for transmitting torque from the main rotary shaft 2 of the arm 3 to the rotary drive mechanism 5 of the container 8 is interposed between the rotary shaft 6 of the container 8 and the rotary drive mechanism 5. This arrangement of the rotary drive mechanism 5 makes it possible to have the container 8 rotated on its own rotary shaft 6 in harmony with the rotational motion of the arm 3.

On the other hand, as is clear from FIG. 3, a container supporting mechanism 7 for supporting the container 8 is rotatably mounted on an upper surface of the raised oblique portion 4 of the arm 3, and assumes a cylindrical shape slightly inclined toward the centerline of the main rotary shaft 2. As is clear from FIG. 3, the cylindrical supporting mechanism 7 has its upper portion opened and its bottom portion closed.

It is also possible for the container 8 to have its longitudinal direction be perpendicular to a horizontal plane, if necessary.

In the arrangement shown in FIG. 3, the container 8 is detachably mounted on the upper surface of the raised oblique portion 4 of the arm 3 through the cylindrical supporting mechanism 7.

Although the rotary arm 3 is shown in FIG. 3 so as to have only one distal end 4 on which the container 8 is mounted, it is also possible for the arm 3 to have a pair of the containers 8 rotatably mounted on diametrically opposite distal ends 4 of the arm 3 through a pair of the container supporting mechanisms 7.

The container supporting mechanism 7 supports the container 8 in which the starting ingredients for the desired food/beverage product such as dough (which is adapted to be formed as the Japanese noodles) or like food/beverage product is received. It is possible for the food/beverage product to comprise juices, mashed potatoes, food pastes, pumpkin soups, marron pastes, fish pastes, meat pastes, dough adapted to be formed as Japanese noodles, and like food/beverage products. In operation, the container supporting mechanism 7 is rotatably driven together with the container 8 fixedly mounted therein.

Consequently, when the container supporting mechanism 7 assumes a cup-like shape (shown in FIG. 3), the mechanism 7 is provided with a convex portion 7a in its inner bottom surface. On the other hand, as is clear from FIG. 3, the container 8 is provided with a concave portion 8a in its outer bottom surface at a position corresponding to that of the convex portion 7a of the container supporting mechanism 7 when the container 8 is mounted in the container supporting mechanism 7. These portions 7a, 8a are meshed with each other when the container 8 is fitted in its supporting mechanism 7, so that the container 8 and its supporting mechanism are integrally rotated in the apparatus during the processing operation. It is also possible to employ any other means for preventing the container 8 from rotating relative to the container supporting mechanism 7. For example, it is possible to form the outer peripheral surface of the container 8 into a polygonal shape in cross section. Such a polygonal shape of the outer peripheral surface of the container 8 corresponds in cross section to a polygonal shape of an inner peripheral surface of the container supporting mechanism 7 to prevent the container 8 from rotating relative to its supporting mechanism 7 during the processing operation performed in the apparatus. In other words, it is possible for the apparatus to employ any other suitable means for preventing the container 8 from rotating relative to its supporting mechanism 7 during the processing operation.

Further, it is also possible to use the container 8 as a tableware when the desired food/beverage product is any one of juices, mashed potatoes, food pastes, pumpkin soups, marron pastes and like food/beverage products. In this case, preferably, the container 8 is improved in appearance.

Figure 4:
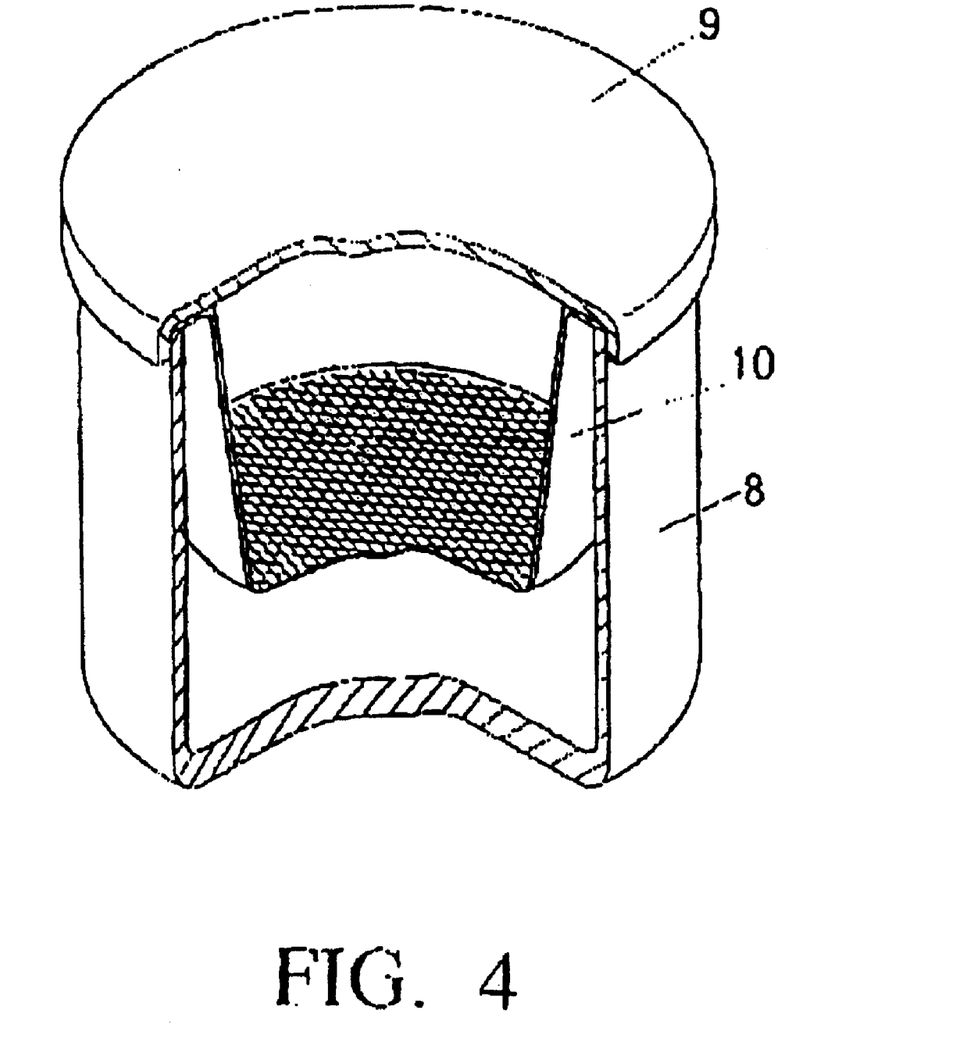
FIG. 4 is a partially broken perspective view of the container in which a sieve-like capsule member is detachably mounted in an insertion manner.

As shown in FIG. 4, in a preparatory stage of the processing operation, the container 8 filled with the starting ingredients has its upper opening portion hermetically sealed or closed with a lid 9. Then, the container 8 is fixedly mounted in the container supporting mechanism 7. After that, the apparatus starts its processing operation by energizing the drive unit 1. The thus energized drive unit 1 rotatably drives the main rotary shaft 2 of the rotary arm 3, so that the container 8 mounted on the oblique distal end 4 of the arm 3 circles around the main rotary shaft 2. As the same time, the container 8 itself rotates on its own rotary shaft 6 in harmony with the rotational motion of the arm 3 due to the provision of the above-mentioned transmission (not shown).

Consequently, in the processing operation conducted in the apparatus, the stating ingredients for the desired food/beverage product contained in the container 8 are subjected to a combined centrifugal force (X+Y), which will be described in detail hereinbelow with reference to FIGS. 1 to 3.

As is clear from FIG. 3, when both the arm 3 and the container 8 are rotated on their rotary shafts 2 and 6, respectively, the starting ingredients contained in the container 8 are subjected to both a centrifugal force X derived from the rotation of the arm 3 and a centrifugal force Y derived from the rotation of the container 8 itself. When the rotations of the arm 3 and the container 8 are coincident in direction (a, b) with each other, these centrifugal forces X, Y are added to each other and therefore strengthened. In contrast with this, when the rotations of the arm 3 and the container 8 are opposite to each other in direction (a, b), their centrifugal forces X, Y are subtracted from each other and therefore weakened.

As a result, the combined centrifugal force (X+Y) generated in any fixed point on the container 8 varies substantially in a sinusoidal manner when both the arm 3 and the container 8 are rotated. Therefore, the starting materials contained in the container 8 of the apparatus are subjected to the combined centrifugal force (X+Y), and therefore effectively stirred, mixed with each other and sufficiently kneaded inside the container 8.

As is clear from FIG. 3, the container 8 rotates on its inclined center axis W corresponding to a centerline of the rotary shaft 6. On the other hand, the arm 3 rotates on its vertical center axis V corresponding to a centerline of the main rotary shaft 2.

Since the container 8 is obliquely mounted on the distal end 4 of the rotary arm 3, the combined centrifugal force (X+Y) generated in the container 8 depends in strength on a level (i.e., height) of each of the starting ingredients received inside the container 8. In other words, variations in strength of the combined centrifugal force (X+Y) increase as such a level of each ingredient inside the container 8 decreases to strength the centrifugal force X derived from the rotation of the arm 2. As is clear from FIG. 3, since the effective radius of the arm 3 increases as the level of each ingredient inside the container 8 decreases, the centrifugal force X derived from the rotation of the arm 2 increases as the level of each ingredient inside the container 8 decreases.

Further, since the container 8 is obliquely mounted on the arm 3, the centrifugal force X acting on each ingredient has a vertical downward component. Such a vertical downward component acts as a kind of additional gravity on the ingredients disposed on an inner bottom of the container 8, and therefore enhances the processing operation (i.e., mixing, stirring and kneading operation) of the ingredients contained in the container 8.

It is possible to control the combined centrifugal force (X+Y) in strength by controlling the rotational speed of each of the rotary arm 3 and the container 8.

Now, the ingredients for the desired food/beverage product will be described in detail.

In preparing a desired juice from vegetables such as tomato and fruits such as strawberries, oranges, grapes and the like serving as its starting ingredients, it is possible for the apparatus to produce the desired juice by using these vegetables and/or fruits themselves as the starting ingredients for the desired juice without peeling off their skins and without removing their seeds.

Figure 5:
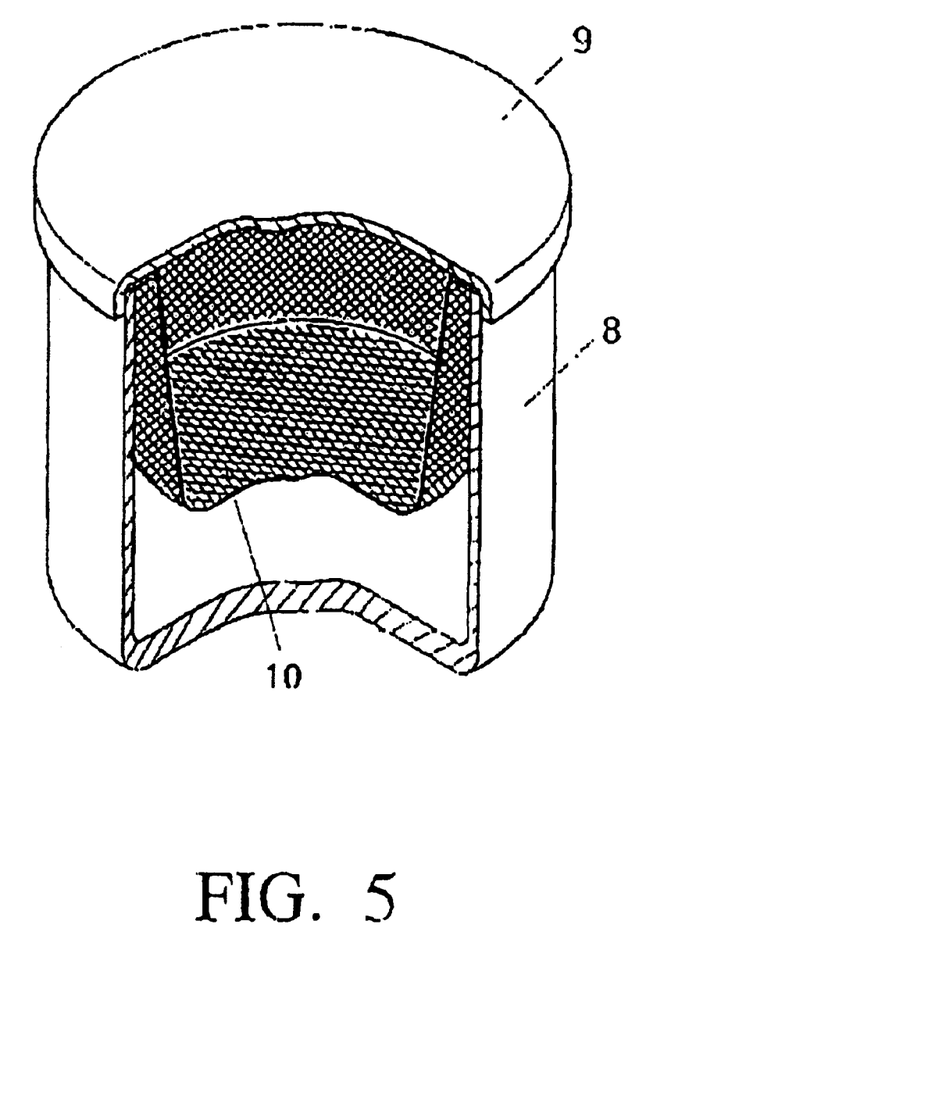
FIG. 5 is a partially broken perspective view of the container in which a modification of the sieve-like capsule member shown in FIG. 4 is mounted in an insertion manner.

In case that the desired food/beverage product is the juice, the containers 8 shown in FIGS. 4 and 5 serve as strainers in the processing operation. The container 8 shown in FIG. 4 is detachably provided with a sieve-like capsule member 10 which is inserted into the container 8 from above and firmly held therein. Due to this, there is no fear that the sieve-like capsule member 10 moves relative to the container 8 in the processing operation.

In a preparatory stage of the processing operation, the sieve-like capsule member 10 is filled with the starting ingredients for the desired juice. For example, the starting ingredients in this case may comprise desired vegetables and/or fruits. After the ingredients are filled in the sieve-like capsule member 10, the container 8 has its upper opening portion hermetically sealed or closed with the lid 9 and then fixedly mounted in the container supporting mechanism 7.

After completion of the preparatory stage, the apparatus starts its processing operation.

In the processing operation, the starting ingredients for the desired juice are subjected to the combined centrifugal force (X+Y) in the sieve-like capsule member 10 of the container 8, so that the starting ingredients are strongly stirred and kneaded inside the sieve-like capsule member 10. As a result, all the skins and all the seeds of the starting ingredients are peeled off and removed, respectively, inside the sieve-like capsule member 10, and therefore remain in the sieve-like capsule member 10. On the other hand, all the juicy elements of the starting ingredients drop out of the sieve-like capsule member 10 and are retained inside a lower space of the container 8 during the processing operation. This enables the apparatus to produce the desired juice from the starting ingredients without peeling off their skin and without removing their seeds in the preparatory stage of the processing operation.

It is possible to use the container 8 itself as a drink cup.

Further, it is also possible to use the container 8 shown in FIG. 4 in producing the mashed potatoes, marron pastes, pumpkin soups and like food/beverage products.

The apparatus is capable of performing the processing operation which, heretofore, only those skilled in the art may perform manually using their own very fine feeling and highly-skilled techniques.

Figure 6:
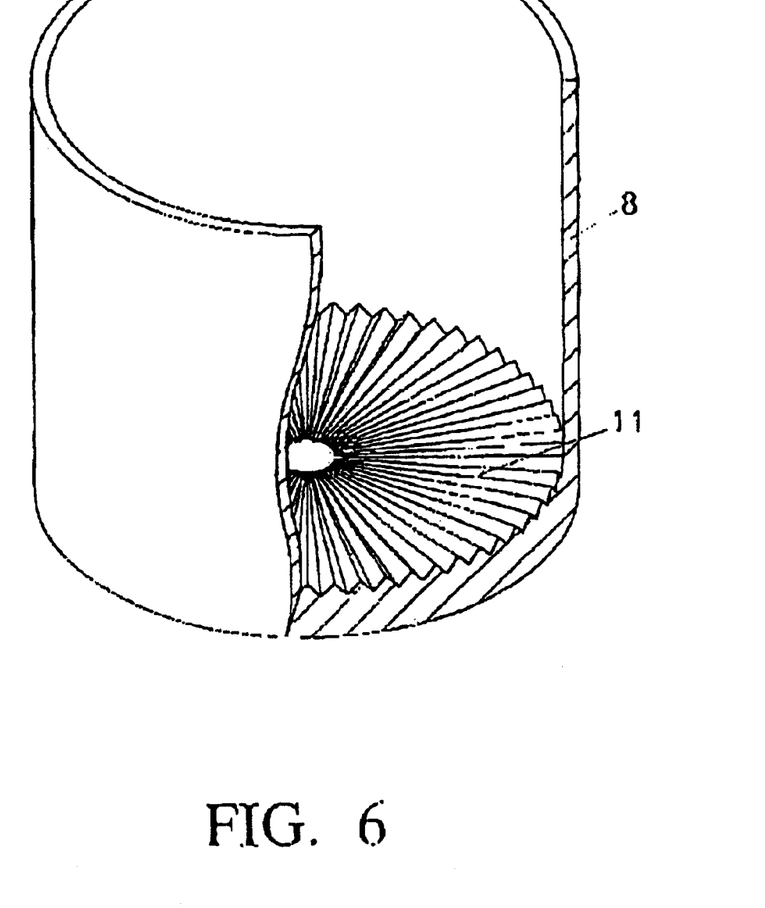
FIG. 6 is a partially broken perspective view of the container provided with a mortar-like bottom portion.

Next, the container 8 shown in FIG. 6 will be described.

In this case, the container 8 is provided with a grater portion 11 in its inner bottom surface, and receives therein the starting ingredients which may be raw ones of vegetables, grains, fishes, meats and the like. It is also possible that the starting ingredients are boiled or steamed ones of vegetables, grains, fishes, meats and/or the like. In the preparatory stage of the processing operation, these starting ingredients are received in the container 8 of FIG. 6. After that, the container 8 has its upper opening portion hermetically sealed or closed with the lid 9 (not shown in FIG. 6, but shown in FIG. 5). Then, the apparatus starts its processing operation to have the ingredients subjected to the combined centrifugal force (X+Y), so that the desired food/beverage product is produced in the container 8 of the apparatus.

It is also possible to use a separate mortar element (not shown) in place of the grater portion 11 of the inner bottom surface of the container 8. Such a separate mortar element assumes a circular shape, and fixedly mounted in the container 8. In this case, the container 8 with the separate mortar element (not shown) is used to wash rice or polish the unpolished rice.

Figure 7:
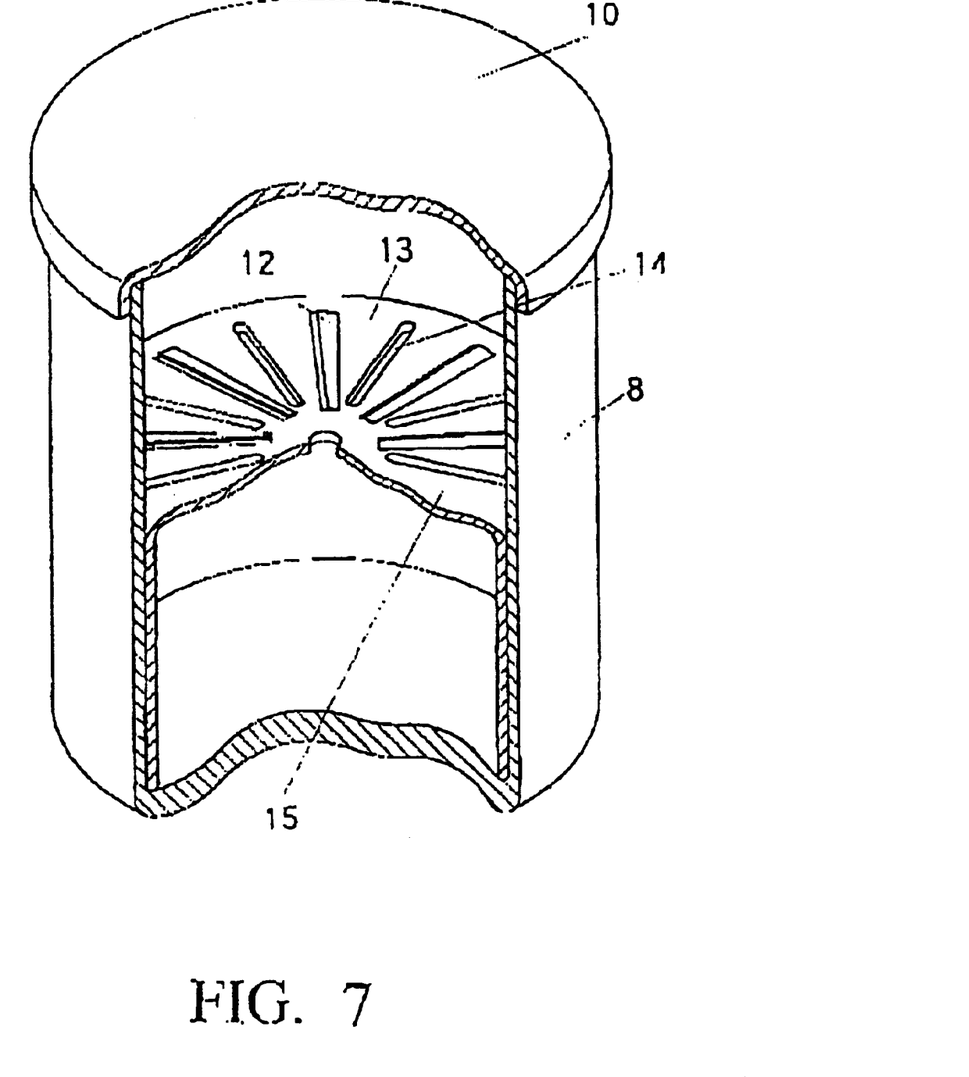
FIG. 7 is a partially broken perspective view of the container provided with a raised floor member in which a plurality of pairs each constructed of a radial blade and a radial slot are so provided as to be spaced apart from each other at predetermined angular intervals.

As shown in FIG. 7, it is also possible to use the container 8 to slice or grind the starting ingredients for the desired food/beverage product in the apparatus. This will be hereinbelow described in detail.

In FIG. 7, the container 8 assumes a cylindrical shape and has its bottom closed and its upper portion opened. As shown in FIG. 7, a raised floor member 15 is fixedly and detachably mounted in the container 8 in an insertion manner. The raised floor member 15 is provided with a plurality of radially arranged blades 12 in its upper horizontal portion 13. Each of the radial blades 12 is adjacent to each of a plurality of slots 14. These slots 14 of the raised floor member 15 permit the sliced or ground pieces of the starting ingredients to fall on the inner bottom surface of the container 8.

Incidentally, for example, the starting ingredients are sliced by the radial blades 12 in the container 8 to produce the sliced pieces, as described above. Formed between a horizontal portion 13 of the raised floor member 15 and the inner bottom surface of the container 8 is a receptacle capsule space for receiving therein the sliced pieces of the starting ingredients for the desired food/beverage product.

In the preparatory stage of the processing operation, the starting ingredients are received in an upper space of the container 8, wherein the upper space is positioned above the horizontal portion 13 of the raised floor member 15 in the container 8. After that, the container 8 has its upper opening portion hermetically sealed or closed with the lid 9. Then, the container 8 is fixedly mounted on the container supporting mechanism 7 as is in the case of the container 8 of FIG. 6. After that, the apparatus starts the processing operation so that the starting ingredients received in the upper space of the container 8 are subjected to the combined centrifugal force (X+Y). Since the combined centrifugal force (X+Y) has a vertical downward component acting as a kind of additional gravity on the starting ingredients on the horizontal portion 13 of the raised floor member 15, the starting ingredients are strongly pressed against the radial blades 12 and therefore effectively sliced thereby in the upper space of the container 8. The thus sliced pieces of the starting ingredients are effectively collected in the above-mentioned receptacle space under the effect of the vertical downward component of the combined centrifugal force (X+Y).

Figure 8:
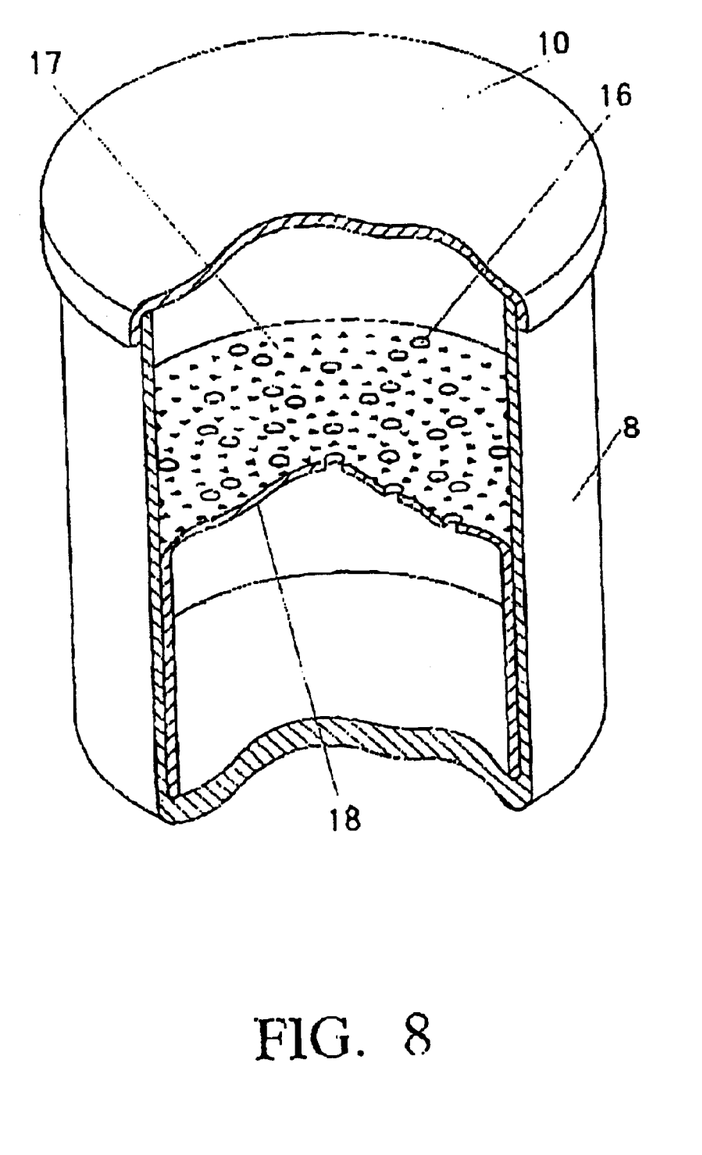

FIG. 8 shows the container 8 in which another type of raised floor member 18 is detachably and fixedly mounted in an insertion manner. As is clear from FIG. 8, in this case, the container 8 assumes a cylindrical shape with a closed bottom portion and an opened top portion. The raised floor member 18 is provided with a plurality of small-diameter through-holes 16 in its horizontal portion 17. The small-diameter through-holes 16 of the raised floor member 18 permit ground pieces of the starting ingredients to fall on the inner bottom surface of the container 8. The horizontal portion 17 of the raised floor member 18 serves as a mortar element or a grater element in the container 8 for pulverizing the starting ingredients into the ground pieces such as fine particles or powders. As is clear from FIG. 8, a suitable receptacle space is defined by both the raised floor member 18 and the bottom wall of the container 8 in the lower portion of the container 8, and receives therein the ground pieces of the starting ingredients in the processing operation. There is substantially no difference between the container 8 shown in FIG. 7 and that 8 shown in FIG. 8 as to each of the preparatory stage and the processing operation. In this case of FIG. 8, the preparatory stage and the processing operation are performed in the same way as those performed in the case of FIG. 7.

In producing the high-quality dough adapted to be formed as the Japanese noodles, an appropriate amount of water is first supplied to the container 8, and then an appropriate amount of flour follows the water and is received in the container 8. After that, the container 8 is hermetically sealed with the lid 9. Then, the same processing operation as that described above is performed in the apparatus to have the starting ingredients subjected to the combined centrifugal force (X+Y), so that the desired-quality dough is produced in the container 8.

More specifically, as shown in FIG. 3, when the container 8 circles around the main rotary shaft 2 and simultaneously rotates on its own rotary shaft 6 in harmony with the rotational motion of the rotary arm 3, the starting ingredients for the desired food/beverage product contained in the container 8 are subjected to the combined centrifugal force (X+Y). As a result, the water and the flour thus contained in the container 8 are stirred, mixed together uniformly and sufficiently kneaded into a smooth, soft dough which is adapted to be formed as the Japanese noodles.

As for the Japanese noodles, it is necessary for the high-quality Japanese noodles to contain a sufficient amount of gluten. In order to produce the high-quality Japanese noodles, it is necessary to uniformly and sufficiently knead the dough with a relatively large kinetic force.

However, it is hard for the above embodiment of the apparatus to produce a so-called "strong bite/mouth feel" dough adapted to be formed as the high-quality Japanese noodles.

Consequently, the inventor of the present invention has studied the above embodiment of the apparatus (shown in FIGS. 4 and 5) and found out the fact that the inner wall surface of the container 8 of the above embodiment is smooth in both its inner peripheral surface and its inner bottom surface, which produces only a simple type of the combined centrifugal force (X+Y) in the container 8 when the container 8 circles around the main rotary shaft 2 and simultaneously rotates on its own rotary shaft 6 in harmony with the circling motion of the container 8, as described in the above with reference to FIGS. 1 and 2.

Figure 9:
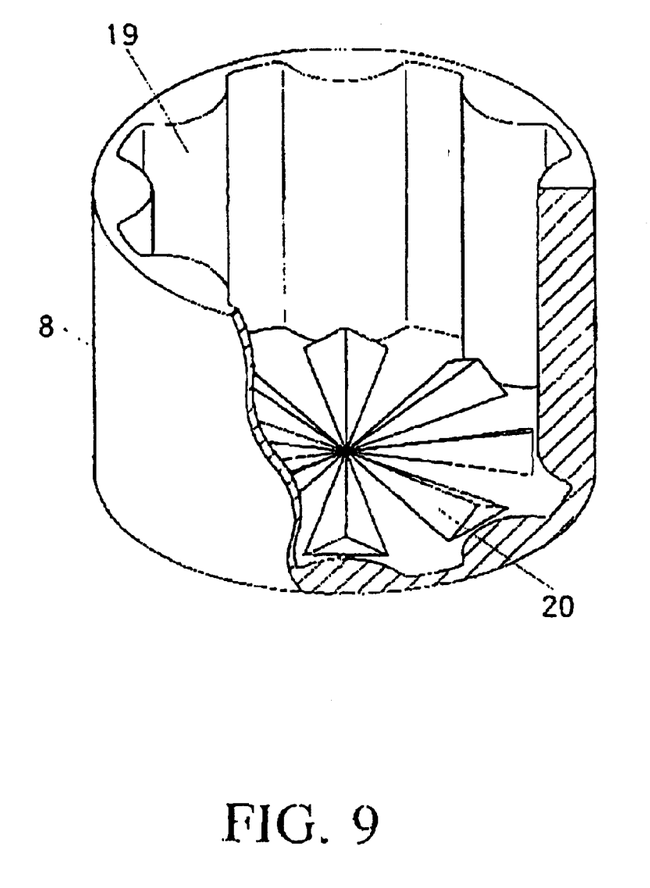
FIG. 9 is a partially broken perspective view of the container provided with the elongated concave-convex portion in each of its inner peripheral surface and its bottom surface.
Figure 10:
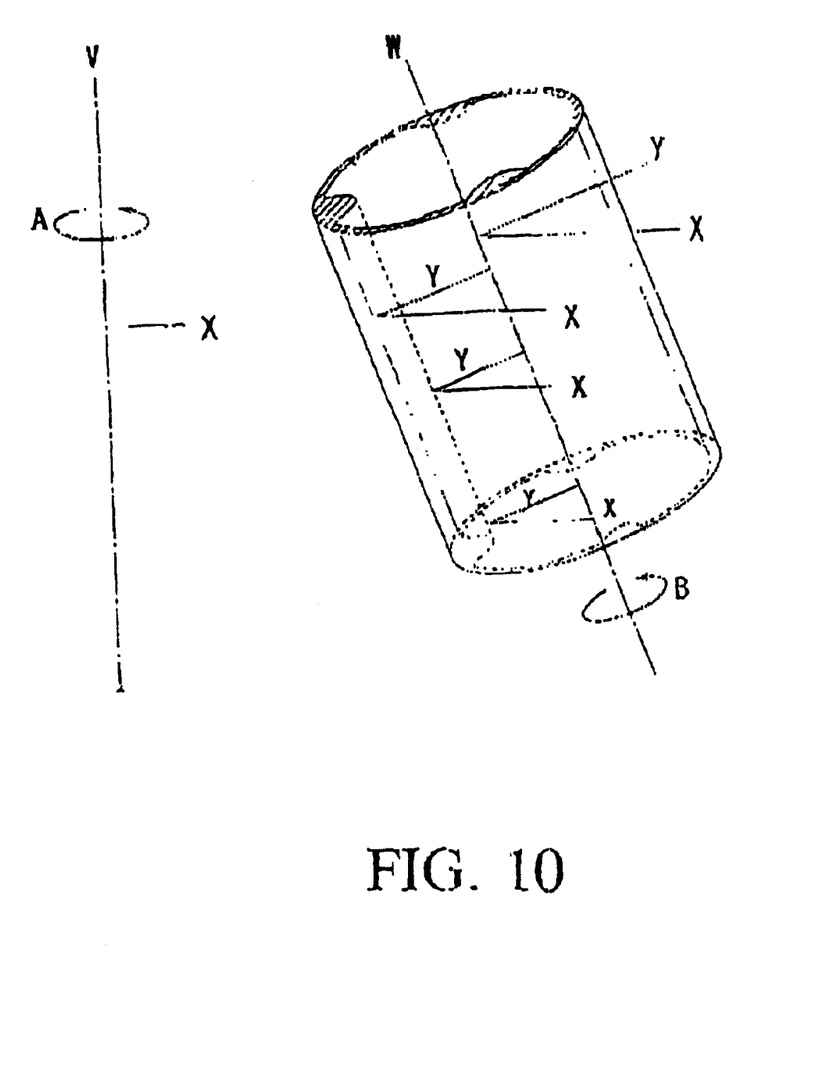
FIG. 10 is a view showing how the combined centrifugal force is generated when the container, which is provided with an inner concave-convex peripheral surface, circles around a main rotary shaft as it rotates on its own center axis.

In this connection, the inventor of the present invention has reached his unique technical idea that: when the combined centrifugal force (X+Y) produced in the container 8 varies periodically in strength, it is possible to have the starting ingredients for the desired food/beverage products subjected to the kneading operation under various conditions. In order to have the combined centrifugal force (X+Y) vary periodically in strength, another embodiment of the apparatus of the present invention is provided. In this another embodiment, as shown in FIG. 9, an elongated ridge-like concave-convex portion 19, which extends along the longitudinal direction of the container 8, is provided in an inner peripheral surface of the container 8 which is fixedly mounted on the container supporting mechanism 7 of the apparatus, as shown in FIG. 3. The above modification (shown in FIG. 9) of the container 8 makes it possible to have the starting ingredients for the food/beverage product subjected to the kneading operation under various conditions other than that of the first embodiment (shown in FIGS. 1 and 2) described above. In the beginning of the kneading operation, as is in the first embodiment, an appropriate amount of water is first supplied to the container 8. Then, the flour is added to the water in the container 8. After that, the container 8 has its upper opening portion sealed or closed with the lid 9 (shown in FIG. 1). The container 8 is then rotatably mounted on the apparatus through the container supporting mechanism 7. After that, the apparatus is energized to perform the kneading operation of the starting ingredients for the desired food/beverage product. This results in the intended high-quality dough, which is strong in bite/mouth feel and adapted to be formed as the Japanese noodles.

The reason why the high-quality dough is obtained in this another embodiment (shown in FIG. 9) is that: the centrifugal force "X" produced by the rotational motion of the rotary arm 3 is combined with another centrifugal force "Y" produced inside the container 8; and, the another centrifugal force "Y" periodically varies in direction relative to the centrifugal force "X". In order to have the centrifugal force "Y" effectively varied inside the container 8, it is also possible to use a suitable concave portion (not shown) in place of the above-mentioned elongated concave-convex portion 19 shown in FIG. 9. Further, in place of the elongated concave-convex portion 19, it is possible to use any other suitable means such as a plurality of ridge portions, a plurality of grooves, a polygonal inner peripheral surface of the container 8 or the like.

Further, as described above, when the container 8 is obliquely mounted on the distal end portion 4 (i.e., obliquely raised distal end portion) of the rotary arm 3 in a manner such that the upper opening portion of the container 8 is obliquely directed to the rotational axis of the arm 3, such an inclination angle of the container 8 relative to the rotational axis of the arm 3 produces a down force component of the combined centrifugal forces (X+Y) inside the container 8. This down force component is essentially derived from the centrifugal force Y produced inside the container 8, is directed to the inner bottom surface of the container 8 and depends on the degree of the inclination angle of the container 8 in strength. In view of the above fact, the inventor of the present invention provides a small elongated concave-convex portion 20 in the inner bottom surface of the container 8, as shown in FIG. 9. Such a small elongated concave-convex portion 20 provided in the inner bottom surface of the container 8 is uniform in height, and effectively hit by the starting ingredients for the desired food/beverage product. This makes it possible to uniformly and sufficiently knead the ingredients inside the container 8. Due to this, the high-quality dough thus produced in the container 8 is strong enough in bite/mouth feel, and therefore adapted to be formed as the Japanese noodles. Incidentally, the small elongated concave-convex portion 20 of the container 8 shown in FIG. 9 may be either an integral portion integrally formed with the inner peripheral surface of the container 8 or a separate member attached to the inner peripheral surface of the container 8.

Figure 11:
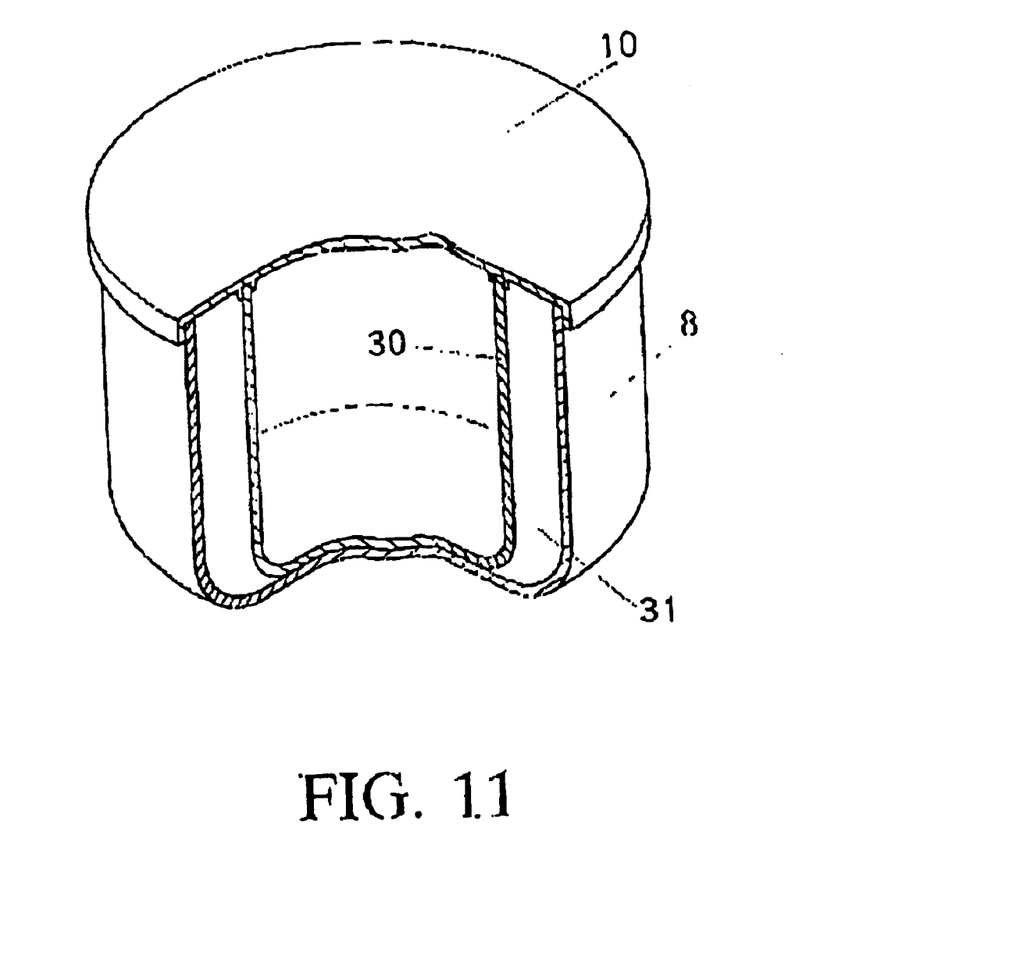
FIG. 11 is a partially broken perspective view of the container receiving therein a partition capsule member, which is mounted in the container in an insertion manner to define a receptacle space between an inner wall of the container and an outer wall of the partition capsule member, for receiving in the space a temperature controlling member.

As shown in FIG. 11, the inventor of the present invention provides further provides another embodiment of the container 8 for receiving therein a partition capsule member 30. This member 30 is detachably mounted in the container 8 in an insertion manner to define a receptacle space 31 between an inner wall of the container 8 and an outer wall of the partition capsule member 30, for receiving in the space 31 a temperature controlling member (not shown). Such a temperature controlling member (not shown) functions to cool or heat the starting ingredients for the desired food/beverage product during its processing operation conducted inside the container 8.

In the further another embodiment of the container 8 shown in FIG. 11, it is possible for the container 8 to have a flange portion or projection (not shown) in its inner peripheral surface in a manner such that a free end of such a flange portion or projection of the container 8 is brought into contact with an outer peripheral surface of the partition capsule member 30. It is also possible to provide such a flange portion or projection (not shown) in an outer peripheral surface of the partition capsule member 30 in a manner such that a free end of such a flange portion or projection of the partition capsule member 8 is brought into contact with the inner peripheral surface of the container 8.

It is necessary to firmly held the partition capsule member 30 inside the container 8 so as not to move relative to the container 8 during the processing operation.

In the processing operation of the starting ingredients for the food/beverage product, the receptacle space 31 (shown in FIG. 11) thus formed between the inner peripheral wall of the container 8 and the corresponding outer peripheral wall of the partition capsule member 30 receives therein a cooling material such as ice, dry ice and the like (not shown), or a heating material such as hot water, boiling water and the like (not shown) together with the starting ingredients.

As shown in FIG. 11, in order to prevent the cooling or heating material received in the receptacle space 31 from spilling out of the receptacle space 31, and, in order to prevent the starting ingredients for the desired food/beverage product received in the partition capsule member 30 from spilling out of the partition capsule member 30, the container 8 has its upper opening portion hermetically sealed or closed with the lid 9.

In the preparatory stage of the processing operation performed in the apparatus, the cooling material such as ice, dry ice or the like is received in the receptacle space 31 in a condition in which the partition capsule member 30 receives therein cream, for example. When the apparatus starts its processing operation, the cream received in the partition capsule member 30 is stirred and kneaded therein. As a result, the cream thus stirred and kneaded while cooled is transformed into ice cream.

It is natural that any other suitable materials or ingredients for the desired food/beverage product are capable of being subjected to the same process as that described above for producing the ice cream.

It is also possible to receive the hot water, the boiling water or like heating material in the receptacle space 31 to heat the ingredient such as chocolate (for example) received in the partition capsule member 30 during its stirring and kneading actions in the processing operation performed in the apparatus. After completion of the processing operation on this case, the chocolate thus stirred and kneaded while heated is transformed into a chocolate paste. Also in this case, it is natural that any other suitable materials or ingredients for the desired food/beverage product are capable of being subjected to the same process as that described above for producing the chocolate paste.

Incidentally, it is also possible to employ an electrically heated wire or heater (not shown) in place of the hot water, boiling water or like heating material received in the receptacle space 31. In this case, the electrically heated wire is fixedly mount on either an inner peripheral surface of the container 8 or an outer peripheral surface of the partition capsule member 30. On the other hand, a power source (not shown) supplies an electric current to the electrically heated wire through a rotary-type contact unit (not shown) mounted on the container supporting mechanism 7. In effect, the electrically heated wire serves as a kind of the heating material contained in the receptacle space 31.

In the apparatus having the above construction, the container 8 is obliquely mounted on the oblique distal end 4 of the rotary arm 3 so as to circle around the main rotary shaft 2 in a condition in which the container 8 rotates on its own oblique rotary shaft 6 in harmony with its circling motion around the main rotary shaft 2. Consequently, when the apparatus starts the processing operation, the combined centrifugal force (X+Y) derived from both the circling motion around the main rotary shaft 2 and the rotational motion of the container 8 on its own rotary shaft 6 is produced inside the container 8. As a result, the starting ingredients contained in the container 8 are subjected to the combined centrifugal force (X+Y) and processed inside the container 8, so that the starting ingredients are transformed into the desired food/beverage product under the effect of the combined centrifugal force (X+Y). It is possible to control the amount of each of the starting ingredients for the desired food/beverage product. It is also possible to arbitrary select the starting ingredients according to a recipe for the desired food/beverage product.

Since the container 8 is hermetically sealed using the lid 9, there is no fear that the starting ingredients for the desired food/beverage product are oxidized during the processing operation. Consequently, the food/beverage product prepared by using the apparatus is excellent in flavor, color and taste.

Further, since the starting ingredients are subjected to the strong combined centrifugal force (X+Y) in the container 8 during the processing operation, any air bubbles mixed in the starting ingredients are finally squeezed out of the food/beverage product such as a liquid product, a pasty product or the like thus prepared in the container 8 of the apparatus. Consequently, it is possible for the apparatus of the present invention to produce the desired food/beverage product free from any air bubble.

As is clear from the above, the apparatus of the present invention can produce any desired food/beverage product in more efficient way and in a shorter time than that required in the conventional apparatus.

What is claimed is:

1. In an apparatus for processing the ingredients for a food/beverage product by using a combined centrifugal force (X+Y) generated inside a container (8) which is obliquely mounted on a raised oblique distal end (4) of a rotary arm (3) which rotates on a main rotary shaft (2), wherein said container (8) received therein said ingredients rotates on its own rotary shaft (2) and simultaneously circles around said main rotary shaft (2) to produce said combined centrifugal force (X+Y) inside said container (8), so that said ingredients are subjected to said combined centrifugal force (X+Y) and thereby mixed and kneaded together inside said container (8), the improvement wherein:

a sieve-like capsule member (10) for receiving said ingredients therein is detachably mounted in said container (8) and firmly fixed thereto, not to move therein when said container (8) is subjected to said combined centrifugal force (X+Y).

2. The apparatus as set forth in claim 1, wherein a small elongated concave-convex portion (20) is formed in an inner bottom surface of said container (8).

3. The apparatus as set forth in claim 1, wherein: a raised floor member (15) is detachably mounted in said container (8) in an insertion manner and fixed thereto, not to move therein when said container (8) is subjected to said combined centrifugal force (X+Y); and, said raised floor member (15) serves as a strainer and is provided with a radial blade (12).

4. The apparatus as set forth in claim 1, wherein: a raised floor member (18) is detachably mounted in said container (8) in an insertion manner and fixed thereto, not to move therein when said container (8) is subjected to said combined centrifugal force (X+Y); and, said raised floor member (18) is provided with a small concave-convex portion (17) in its upper surface.

5. The apparatus as set forth in claim 1, wherein said container (8) is provided with a small concave-convex portion in each of its inner peripheral surface and its inner bottom surface.

6. The apparatus as set forth in claim 1, wherein: a partition capsule member (30) is detachably mounted in said container (8) in an insertion manner to define a receptacle space (31) between an inner peripheral surface of said container (8) and an outer peripheral surface of said partition capsule member (30); said partition capsule member (30) is firmly mounted so as not to move in said container (8) and receives therein said ingredients; and, said receptacle space (31) receives therein a cooling material for cooling said ingredients or a heating material for heating said ingredients.

* * * * *